Sept. 12, 1967 H. REHRIG ET AL 3,341,060
MILK CRATE
Filed Dec. 11, 1964
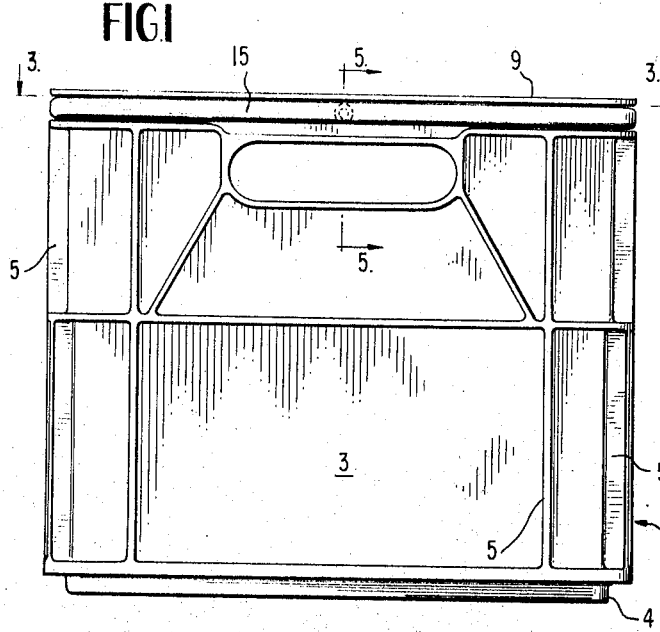
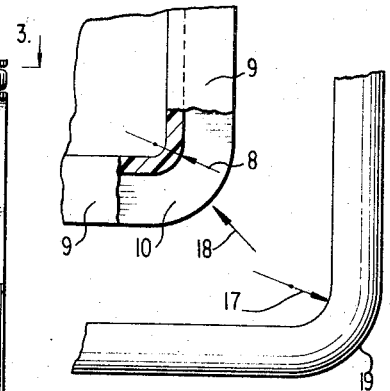
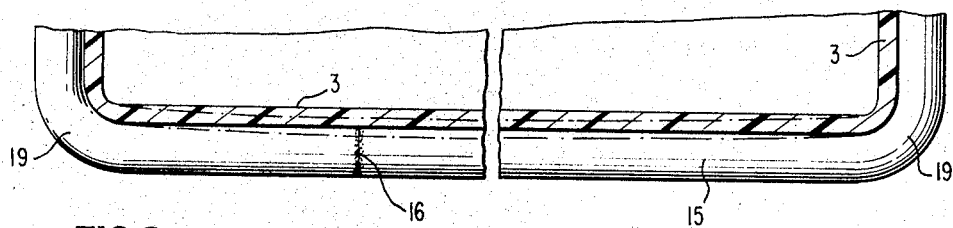
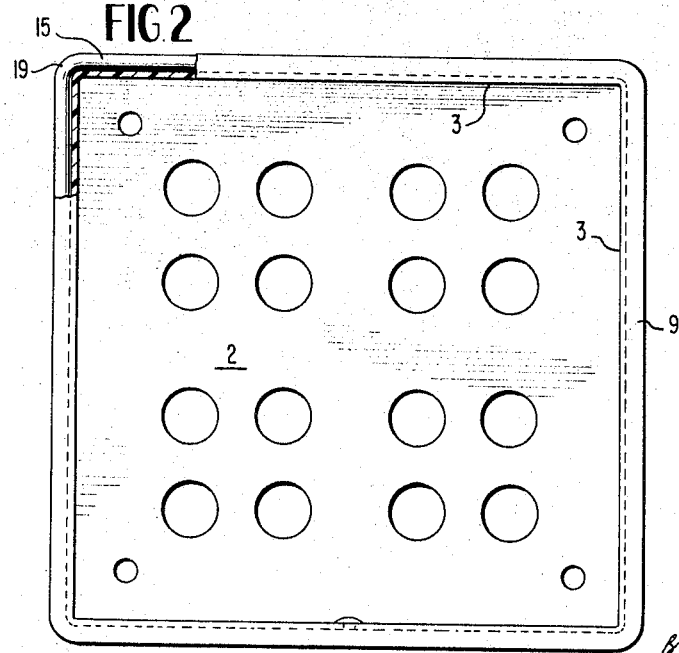
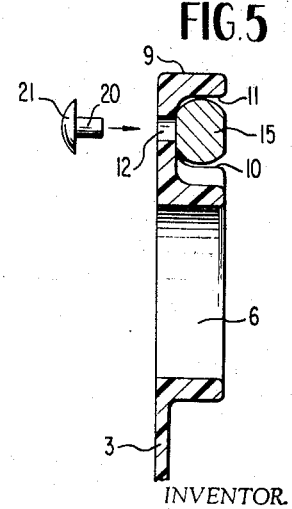
INVENTOR.
HOUSTON REHRIG
BY
Browne, Schuyler & Beveridge
ATTORNEYS

United States Patent Office 3,341,060
Patented Sept. 12, 1967

3,341,060
MILK CRATE
Houston Rehrig, Pasadena, Calif., assignor to Rehrig Pacific Company, Los Angeles, Calif., a corporation of California
Filed Dec. 11, 1964, Ser. No. 417,715
6 Claims. (Cl. 220—73)

ABSTRACT OF THE DISCLOSURE

A molded plastic milk crate having an endless, relatively rigid, metal reinforcing rod member extending around its outer periphery within an outwardly directed channel formed around the crate adjacent the open top thereof. The reinforcing rod member retains the side panels of the crate against warping and against inward deflection due to lateral loads such as may be applied by automatic filling and handling equipment.

---

This invention relates to crates, and more particularly to crates molded from a synthetic resin material and suitable for handling milk bottles, cartons, or the like, and to a method of manufacturing such crates.

Although receptacles formed from a molded synthetic resin material (hereinafter referred to broadly as plastic) for handling material or multiple articles have met widespread acceptance, these receptacles have not proven entirely satisfactory for handling certain articles such as milk bottles and cartons. Although crates formed from these plastic materials possess many desirable properties, such as their relatively low cost as compared to a wire frame or wooden crate, their neat and pleasing appearance, and the ease with which they may be cleaned, other properties of the plastic crate have, in the past, proven so disadvantageous as to prevent their widespread acceptance. For example, in the modern dairy the crates are conveyed through the plant on power driven conveyers where the crates are cleaned and the filled bottles or cartons are automatically placed in the crates, with the filled crates being transferred to storage or to a loading dock area. However, due to the inherent flexibility of the plastic material used to form the crates, in combination with repeated cleaning and rough handling, the open tops and sidewalls of the crates tend to become distorted, thereby making it difficult to fill the crates with cartons or bottles by use of automatic equipment. One of the primary problems in this filling operation is the tendency of the top edges of the sidewalls of the crate to become deflected inwardly so that the cartons or bottles being dropped into the crate strike the top edge of the crate.

Another difficulty encountered in the use of molded plastic crates is the tendency of the crates to collapse upon the application of lateral, or side pressure. This is a particularly serious problem in the dairy industry where the filled crates are being conveyed by power driven conveyors. When a filled crate becomes stopped on a driven conveyor as upon rounding a corner on a conveyor, or otherwise, other crates following on the conveyor colliding with the stalled crate tend to crush the bottles or cartons of milk contained in the crate. This is particularly critical with crates which are filled with paperboard cartons of milk and which have become stalled on a curve of a conveyer so that following cartons collide to apply a force diagonally across the corners of the stalled crate, in which case the collapsed crate tends to open the sealed top of the paperboard cartons of milk, permitting the milk either to become spilled or contaminated.

Accordingly, it is an object of this invention to provide an improved molded plastic crate which will retain its desired original shape throughout the life of the crate.

Another object of the invention is to provide an improved molded plastic crate having means to prevent crushing from lateral loads.

Another object of the invention is to provide an improved molded plastic crate suitable for use by the dairy industry and which may be handled by automatic machinery conventional to the dairy industry.

Another object of the invention is to provide a novel method of manufacturing molded plastic crates of this type in a simple, efficient and economical manner.

In the attainment of the foregoing and other objects an important feature of the invention resides in providing a molded plastic milk crate with a pair of vertically spaced opposed flanges extending around the outer periphery adjacent the top of the crate and positioning an endless reinforcing rod between the flanges. The crate is substantially rectangular in cross section, with the sidewalls joined at the corners in a relatively short-radius, continuous arc to provide smooth, rounded corners. The inner periphery of the endless reinforcing rod closely conforms to the outer surface of the sidewalls between the flanges, and the sidewalls may be attached to the reinforcing rod at a point intermediate the corners of the crate to insure that the sidewalls do not deflect inwardly away from the reinforcing rod. Preferably, the reinforcing rod is formed into its final generally rectangular shape from an elongated steel rod, with the abutting ends of the rod not being joined to permit their being spread apart to facilitate installation on the crates. After the rod is positioned in the channel between the flanges, the ends are resistance-welded to form an endless ring.

Other and further objects will become apparent from the following specification taken with the accompanying drawings:

FIG. 1 is an elevation view of a crate embodying the present invention;

FIG. 2 is a top plan view of the crate shown in FIG. 1, with parts broken away to more fully show other parts;

FIG. 3 is a fragmentary sectional view taken on line 3—3 of FIG. 1;

FIG. 4 is an enlarged fragmentary view showing the relative dimensions of certain of the parts; and, FIG. 5 is a fragmentary sectional view taken on line 5—5 of FIG. 1.

Referring now to the drawing, a molded crate according to the present invention, indicated generally by the numeral 1, is shown having a substantially flat bottom panel 2 and four vertically extending side panels 3. Bottom panel 2 may be formed, on its underside, with a stacking ring 4, and the vertical side panels 3 may be integrally formed with a plurality of reinforcing or stiffening ribs 5, as desired. Also, a handle may be formed in the side panels as at 6, in the conventional manner.

The horizontal cross section of the crate is substantially rectangular, with the side edges being joined at corners having a relatively short radius indicated generally at 8 in FIG. 4 to present a smooth rounded corner. A pair of vertically spaced, integral flanges 9 and 10 are formed around the crate adjacent the top outer periphery thereof, forming a substantially C-shaped channel 11 around the periphery of the crate adjacent its top. An opening 12 extends from channel 11 through each of the sidewalls 3 at a point approximately midway between the respective side edges or corners of the panels.

A reinforcing ring 15, formed from a length of steel rod shaped into a generally rectangular configuration and having its adjoining ends butt welded as at 16, is positioned between flanges 9, 10. The inner periphery of ring 15 is substantially equal to the outer periphery of crate 1 within the channel 11, with the corners 19 of ring 15 being rounded so that the radius 17 of the inner surface of ring 15 is somewhat greater than radius 8 of the outer surface of the corners of the crate. As illustrated in FIG. 3 of the drawings, when reinforcing ring 15 is positioned within channel 11, the slightly greater radius 17 will cause the reinforcing member 15 to exert an inward force on each of the corners of the crate as indicated by the arrow 18 in FIG. 4, thereby compressing and tending to cause each of the side panels to deflect outwardly to contact and closely conform to the shape of the reinforcing rod between the corners. Since the radius 17 is slightly greater than radius 8, and further since the inner periphery of member 15 is equal to the outer periphery of the crate within channel 11, the distance between parallel sides of the reinforcing ring will be slightly greater than the distance between the outer surface of parallel sides of the channel 11, thereby permitting the sides 3 to deflect outwardly slightly and be retained in this outwardly deflected position by the compressive stress set up in the side panels 3. This reduces the tendency of the side panels to bow inwardly or be deflected inwardly due to repeated handling and cleaning operations so that the open top of the crate will always maintain its desired original generally rectangular shape.

Since the crates are designed to handle relatively heavy articles such as a plurality of bottles of milk, and since they are subjected to repeated and rough handling, the molded crate must necessarily be relatively rigid even without the use of a separate reinforcing member. This rigidity, due both to the shape of the molding and to the thickness of the material makes the installation of a closed ring in channel 11 difficult to accomplish without excessive distortion of the flanges 9 and 10. However, it has been found that, by forming the ring 15 into its generally rectangular shape, but without joining the adjacent ends, the ring may be spread to move the ends apart a distance sufficient to permit easy installation of the ring into channel 11 without damaging the ring. The ends of the rod may then be pressed together and quickly resistance welded, as at 16 in FIG. 3, without generating sufficient heat at the point to adversely effect the plastic material around the point.

To assure that rough handling, or other forces applied to the side panels 3 of the crate, does not force the side panels away from contact with the inner periphery of frame member 15, a rivet 20 having a head 21 of diameter substantially larger than opening 12 is inserted through openings 12 of each of the side panels and resistance welded to the inner periphery of member 15 as shown in FIG. 5.

Reinforcing member 15 is formed from a relatively high strength steel rod, with the rod being of sufficient size and rigidity to withstand all of the normal lateral loads which may be applied to a milk crate during the normal handling and use thereof.

While I have disclosed and described a preferred embodiment of my invention, I wish it understood that I do not intend to be limited solely thereto, but that I do intend to cover all embodiments thereof which would be obvious to one skilled in the art and which come within the spirit and scope of my invention.

I claim:

1. A milk crate comprising a rectangular bottom panel, molded plastic side panels extending upwardly from said bottom panel integrally joined at the corners of the crate, the outer surface of said corners being rounded with the rounded corners having a relatively short radius, a pair of vertically spaced flanges integrally formed around the outer periphery of said crate adjacent the top of said side panels, said flanges cooperating to define an outwardly directed channel adjacent the top of said crate, an endless generally rectangularly shaped reinforcing rod member extending around the outer periphery of said crate between said flanges, the inner periphery of said generally rectangularly shaped rod member being substantially equal to the outer periphery of said crate between said flanges, the corners of said generally ractangular reinforcing rod member being rounded with the radius of curvature of the rounded corners on said reinforcing rod being greater than the radius of curvature of the corners of said panels, said reinforcing rod engaging and applying an inwardly directed force to each of the corners of said crate when said rod is positioned between said flanges to cause the said side panels to deflect outwardly against said reinforcing rod member.

2. The milk crate as defined in claim 1 including a rivet member extending through each of said side panels and welded to said rod member to positively retain said panels in engagement with said reinforcing rod member.

3. A milk crate comprising a bottom panel, molded plastic side panels extending upwardly from said bottom panel and integrally joined at the corners of the crate, a pair of vertically spaced flanges integrally formed along the outer surface of said side panels adjacent to the top thereof, said flanges cooperating to define an outwardly directed channel around the outer periphery of said crate, an endless reinforcing rod member extending around the outer periphery of said crate between said flanges, and means securing each of said panels to said reinforcing rod to prevent lateral deflection thereof relative to said rod.

4. A milk crate as defined in claim 3 wherein said rod is dimensioned to apply a compressive force to each corner of the side panels to cause said side panels to deflect outwardly against said rod.

5. The method of forming a milk crate having a bottom panel and molded plastic side panels extending upwardly from said bottom panel and integrally joined at the corners of the crate, comprising integrally forming an outwardly directed channel around the outer periphery of the crate adjacent the top of the side panels, forming an elongated metallic rod into a reinforcing ring with the ends of said rod positioned adjacent one another and with said ring having an inner periphery equal in length and generaly conforming to the outer periphery of the crate within said channel, spreading said ring to space the ends of said rod apart, retaining said ends in spaced relation and positioning said ring in said channel, pressing said ends together, and resistance welding said ends together within said channel.

6. The milk crate defined in claim 3 wherein said securing means comprises a metal rivet extending through each of said side panels and welded to said reinforcing rod.

References Cited

UNITED STATES PATENTS 2,237,102  4/1941  Hungerford _____ 220—73
2,876,498  3/1959  Nason _____ 264—92

THERON E. CONDON, *Primary Examiner.*

JAMES MARBERT, *Examiner.*